United States Patent [19]

Jean et al.

[11] Patent Number: 5,177,034
[45] Date of Patent: * Jan. 5, 1993

[54] GALLIUM CRYSTAL GROWTH INHIBITOR FOR GLASSY LOW DIELECTRIC INORGANIC COMPOSITION

[75] Inventors: Jau-Ho Jean, Export; Tapan K. Gupta, Monroeville, both of Pa.

[73] Assignee: Aluminum Company of America, Pittsburgh, Pa.

[*] Notice: The portion of the term of this patent subsequent to Aug. 25, 2009 has been disclaimed.

[21] Appl. No.: 787,364

[22] Filed: Nov. 4, 1991

[51] Int. Cl.⁵ .................. C03C 14/00; C03C 8/14; C03C 8/02; C04B 35/02
[52] U.S. Cl. ..................................... 501/17; 501/18; 501/21; 501/32; 501/66; 501/68; 501/128; 501/153; 501/154
[58] Field of Search .......... 501/17, 18, 21, 32, 501/66, 70, 128, 153, 154, 55, 65, 67, 69, 19, 68, 127

[56] References Cited

U.S. PATENT DOCUMENTS

| | | | |
|---|---|---|---|
| 3,926,648 | 12/1975 | Miller | 106/39.6 |
| 4,642,148 | 2/1987 | Kurihara et al. | 156/89 |
| 4,672,152 | 6/1987 | Shinohara et al. | 174/68.5 |
| 4,755,490 | 7/1988 | DiLazzaro | 501/17 |
| 4,788,046 | 11/1988 | Barringer et al. | 423/122 |
| 4,849,379 | 7/1989 | McCormick | 501/20 |
| 4,879,261 | 11/1989 | Burn | 501/32 |
| 5,079,194 | 1/1992 | Jean et al. | 501/17 |

OTHER PUBLICATIONS

M. B. Voif "Chemical Approach to Glass", Glass Science and Technology; vol. 7, Elsevier Science publishing Company, Inc., N.Y., 1984, p. 416.

Primary Examiner—Mark L. Bell
Assistant Examiner—Michael Marcheschi
Attorney, Agent, or Firm—David W. Pearce-Smith

[57] ABSTRACT

A ceramic composition for forming a ceramic dielectric body having a dielectric constant of less than about 4.5 and a TCE of less than about 4.0 ppm/c. The composition comprises a mixture of 20-50 wt. % borosilicate glass 40-75 wt. % of a glass selected from the group consisting of glass containing 95-98 wt. % silica, titanium silicate glass and combinations thereof and sufficient amounts of gallium to inhibit the formation of crystalline forms of silica. The composition can be combined with a polymeric binder to produce an unfired green tape which is co-fireable with high conductivity metallurgies such as gold, silver and silver/palladium.

13 Claims, 1 Drawing Sheet

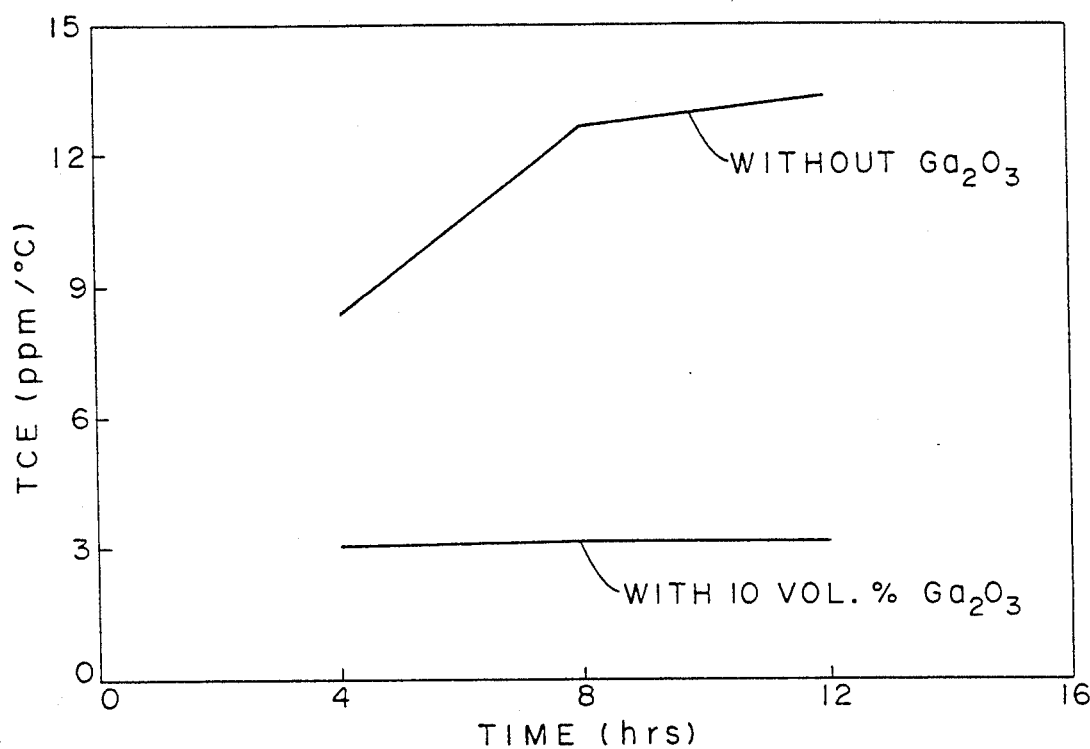

GALLIUM CRYSTAL GROWTH INHIBITOR FOR GLASSY LOW DIELECTRIC INORGANIC COMPOSITION

FIELD OF THE INVENTION

The invention relates to dielectric compositions. More particularly the invention relates to glass and ceramic materials that are sintered at low temperatures to produce dense bodies having low coefficients of thermal expansion and a dielectric constant below 4.5.

BACKGROUND OF THE INVENTION

Conventionally, alumina ($Al_2O_3$) is used as a dielectric material for microelectronic packages. It has excellent electrical (insulating), thermal and mechanical (especially strength) properties. Alumina based packages, generally containing 4-10 wt. % glass, require sintering temperatures above 1500° C. which necessitates the use of refractory metals such as molybdenum or tungsten for the electrical interconnections so that the metal can be co-fired with the package. These metals have poor electrical conductivity as compared to highly conductive metals such as copper, and secondly, they require the use of strongly reducing atmospheres during co-firing necessitating expensive furnace systems.

The development of multilayer ceramic circuit boards is toward higher frequency, higher density and higher speed devices. $Al_2O_3$ has a relatively high dielectric constant of about 9.9, causing high signal propagation delay and low signal-to-noise ratio (crosstalk). The signal propagation delay (t) in ceramic substrates is affected by the effective dielectric constant of the substrate (k') in the following equation:

$$t = (k')^{0.5}/C$$

where C is the speed of light. It can be found that the signal propagation delay can be dramatically reduced by a reduction in the effective dielectric constant of the substrate. For example, if the dielectric constant of a material is reduced from 10 (approximately the k' of $Al_2O_3$) to 5, the signal propagation delay can be reduced by 30%. A small signal delay is especially important for the substrate housing a chip with a very dense integrated circuit, for instance, very large scale integrated circuit (VLSI).

Furthermore, alumina has a coefficient of thermal expansion of about $7.4 \times 10^{-6}$/°C. (in the 20°-200° C. range) as compared to $3.4 \times 10^{-6}$/°C. for silicon. This mismatch in thermal expansion results in design constraints and reliability concerns when attaching a silicon wafer to the substrate.

Heretofore, most of the dielectric materials used in multilayer circuits have been conventional thick film compositions. A typical circuit is constructed by sequentially printing, drying and firing functional thick film layers atop a ceramic substrate which is usually 92-96 wt. % $Al_2O_3$. The multiple steps required make this technology process intensive with the large number of process steps and yield losses contributing to high costs. Thick film technology nevertheless fills an important need in microelectronics and will continue to do so in the foreseeable future.

Recently, dielectric thick film compositions with low dielectric constants of 5 have been introduced. However, ceramic substrates with low dielectric constants less than 4.5 and thermal expansion coefficients equal to that of silicon (3.4 ppm/°C.) are not readily available.

Low temperature co-fired (LTCF) technology has been recently introduced as a method for fabricating multilayer circuits. This technology offers the combination of the processing advantages of HTCF technology and the materials advantages of thick film technology. These LTCF tape systems have firing temperatures below 1000° C. and allow the use of high conductivity metals such as silver, gold, silver/palladium and copper (copper, however, requires reducing atmospheres). Most of these tape systems have dielectric constants between 6 and 8 and encompass a range of thermal coefficient of expansion (TCE).

Currently, there is no readily available low temperature co-fired dielectric tape system using a glass plus ceramic approach that offers both low dielectric constant (less than 4.5) and a TCE matched to silicon (3.4 ppm/°C.). There exists a need for a low temperature co-fireable tape dielectric which (1) has a low dielectric constant (less than 4.5), (2) has a thermal expansion coefficient very close to the value for silicon (3.4 ppm/°C.), and (3) can be fired in air at a low temperature (less than 950° C.), thus permitting the use of high conductivity metallurgies such as gold, silver and silver/palladium.

The principal object of the invention is to provide a material that can be sintered into a body that has a dielectric constant of less than 4.5 at 1 MHz, and a thermal expansion coefficient below 4.0 ppm/°C.

Another object of the invention is to provide ceramic materials that are sintered at temperatures less than 950° C. for 4-20 hours without significantly increasing their thermal coefficient of expansion.

Another object of the invention is to provide ceramic materials that are sintered at low temperatures to produce dense bodies (greater than 95% of theoretical density) having low coefficients of thermal expansion and a dielectric constant below 4.5 and have a glass content below 50 vol. %. A reduction in the glass content of the sintered body is very desirable in that the glassy phase is responsible for shape distortion or warpage during co-firing. If the sintered body is to be used in an electronic package, the shape distortion associated with high volume percent glass content can cause the via holes to misalign during co-firing of the metal and ceramic. A glass content below 50 vol. % will reduce the likelihood that warpage will occur.

SUMMARY OF THE INVENTION

The invention is directed to a ceramic composition for forming a ceramic dielectric body having a dielectric constant of less than about 5.0 at 1 MHz and a TCE of less than about 4.0 ppm/c, the composition being co-fireable with high conductivity metals such as gold, silver and silver/palladium. The composition comprises a mixture of 20-50 wt. % borosilicate glass, 40-75 wt. % of a glass selected from the group consisting of glass containing 95-98 wt. % silica, titanium silicate glass and combinations thereof and sufficient amounts of a gallium-containing material to inhibit the formation of crystalline forms of silica. In a preferred embodiment of the invention the gallium compound is incorporated into the mixture from the group consisting of $Ga_2O_3$, $Ga_2SiO_5$, $Ga_2TiO_5$, GaAs and $GaPO_4$.

In a second aspect, the invention is directed to an unfired green tape comprising the composition formed from the above identified mixture dispersed in a polymeric binder that can be fired for periods of time well in excess of four hours without increasing its TCE.

In a further aspect, the invention is directed to a multilayer ceramic substrate comprising layers of the above composition and interconnected conductor layers of copper therebetween, the assemblage having been fired in excess of four hours to form a dense hermetic structure.

In a yet another aspect, the invention is directed to a multilayer ceramic capacitor comprising layers of the above composition with conductor layers of copper therebetween, the assemblage having been fired to form a dense hermetic structure.

BRIEF DESCRIPTION OF THE DRAWING

Other features of the present invention will be further described or rendered obvious in the following relating description of the preferred embodiments which is to be considered together with the accompanying drawing, wherein:

FIG. 1 is a graphical illustration of thermal coefficient of expansion (TCE) versus time.

DETAILED DESCRIPTION OF THE INVENTION

The preferred glass plus ceramic composition of the present invention comprises a mixture of two principal components: borosilicate glass and a glass selected from the group consisting of titanium silicate glass and high silica glass. The percentages of each component may be varied within the ranges delineated below, depending on the final desired properties of the fired ceramic material. In addition to the two principal components, the present invention includes sufficient amounts of a third material, gallium, which acts to suppress the formation of crystalline forms of silica during the firing of the mixture of the borosilicate and high silica glass. As will be discussed in greater detail below, the phrase "suppress the formation of crystalline forms of silica" is used herein to mean that the fired product contains less than 5% crystalline silica.

Dense ceramic bodies can be formed from such compositions by normal manufacturing techniques and low temperature (i.e., 850-1000° C.) sintering. In a preferred application of the invention, such a mixture is formed into a thin tape, via holes punched through the tape at desired locations, and one or more metal conductor paths are formed on the punched tape. Suitable metals for the conductor paths include copper, silver, gold, platinum/gold and palladium/silver. The tape is subsequently sintered at low temperature, typically after two or more sections have been laminated together to form a multilayer circuit substrate.

It has been found that low firing temperature glass plus ceramic compositions can be made from mixtures containing less than 50 wt. % borosilicate glass. As stated above, a reduction in the glass content of the sintered body is very desirable in which the glassy phase is responsible for shape distortion or warpage during co-firing. A glass content below 50 wt. % will reduce the likelihood that warpage and misalignment of via holes will occur. Low firing temperature glass plus ceramic compositions of the invention are produced by providing a mixture of powdered ingredients, including 20-50 wt. % borosilicate glass 40-75 wt. % of a glass selected from the group consisting of glass containing 95-98 wt. % silica, titanium silicate glass and combinations thereof and sufficient amounts of gallium to suppress or inhibit the formation of crystalline forms of silica. A quantity of the mixture is then formed into a desired shape using conventional procedures, and sintered at a temperature of at least 850° C., preferably 850-950° C., and most preferably 900-950° C. The sintering may be conducted in an oxidizing, neutral or reducing atmosphere.

The term "glass plus ceramic" is used herein to describe a sintered ceramic composition which is formed from a mixture of crystalline ceramics and glass. The ceramic and glass phases of the glass plus ceramic composition remain distinct after firing. The glass in a glass plus ceramic system retains its glassy characteristic after firing and is said to be a non-crystallizable glass in that composition. The ceramic in a glass plus ceramic system need not be a crystalline material; it may also be a glass. The ceramic, whether glassy or crystalline in nature, retains its initial characteristic after firing and is said to behave as a ceramic in that fired composition. In addition, the term "glass plus ceramic" is used herein to distinguish systems containing non-crystallizable glasses from "glass-ceramic" systems in which the glass undergoes a controlled devitrification during firing and becomes crystalline.

The term "borosilicate glass" is used herein to describe a family of glasses containing 20-35 wt. % boron oxide ($B_2O_3$) and 60-75 wt. % silicon oxide ($SiO_2$). Other oxides commonly found in borosilicate glass include $Al_2O_3$, $B_2O_3$, CaO, $K_2$, $Li_2O$, $Na_2O$ and $SiO_2$ in amounts such that the mixture has a softening point of about 800° C.

The term "zinc borate glass" is used herein to describe a family of low temperature glasses containing 25-35 wt. % boron oxide ($B_2O_3$) and 65-75 wt. % zinc oxide (ZnO).

The term "high silica glass" is used herein to describe a family of glasses containing greater than 95 wt. % silicon oxide ($SiO_2$) and 3-4 wt. % $B_2O_3$ and 0-1 wt. % $Al_2O_3$ The term "titanium silicate glass" is used herein to describe a family of silicates containing 1-20 wt. % $TiO_2$ and 80-99 wt. % $SiO_2$. Both the high silica glass and the titanium silicate glass have a softening point greater than 1500° C. and do not devitrify when used in a ceramic composition which is fired below 1000° C. They can, therefore, be said to behave like a crystalline filler since they remain distinct from the other ceramic components of the material.

The cristobalite and quartz phases formed during firing remains in the material on cooling. Cristobalite has a TCE of about $50 \times 10^{-6}/°C$. (in the 20°-300° C. range) and quartz has a TCE of about $13 \times 10^{-6}/°C$. as compared to $3.5 \times 10^{-6}/°C$. for silicon. The presence of cristobalite and/or quartz in the fired product raises the TCE and lowers the mechanical strength of the product. The loss of mechanical strength is due to the volume change associated with phase transformation which generates microcracks.

The terms "gallium-containing material" and "gallium compound" are intended to include, but are not limited to $Ga_2O_3$, $Ga_2SiO_5$, $Ga_2TiO_5$, GaAs, $GaPO_4$ and combinations thereof.

The term "crystalline forms of silica" ($SiO_2$) as used herein is intend to include quartz, tridymite, flint and cristobalite. As stated above the presence of crystalline phases of silica, such as quartz and cristobalite, remain in the material during firing and on cooling and its presence in the fired product raises the TCE and lowers the mechanical strength of the product. Linear thermal expansion coefficients for polymorphic forms of silica and glasses are shown in Table 1.

TABLE 1

| Composition | Thermal Coefficient of Expansion | | | |
|---|---|---|---|---|
| | 20°–100° C. | 20°–200° C. | 20°–300° C. | 20°–600° C. |
| Quartz | 11.2 | — | 13.2 | 23.7 |
| Cristobalite | 12.5 | — | 50.0 | 27.1 |
| Tridymite | 17.5 | — | 25.0 | 14.4 |
| Fused Silica Glass | — | 0.5 | — | — |
| High Silica Glass | — | 0.7 | — | — |
| Borosilicate Glass | — | 3.3 | — | — |

The term "finely divided" is used herein to describe material that has a particle size in the range of about 0.1 microns to 10 microns.

The glasses can be prepared by conventional glass-making techniques by mixing the desired components in the desired proportions and heating the mixture to form melt. As is well known in the art, heating is conducted to a peak temperature and for a time such that the melt becomes entirely liquid and homogeneous.

The above-described glasses are particularly desirable for use in electronic packages, such as VLSI applications, because of their low polarizability and thus low dielectric constant. Because borosilicate glasses by themselves tend to have low softening points, it is necessary to increase the softening point by the addition of large amounts of other glasses which have high $SiO_2$ concentrations. High silica glasses are more durable than those with high $B_2O_3$ concentrations.

A preferred borosilicate glass comprises about 0–1 wt. % $Al_2O_3$, 25–30 wt. % $B_2O_3$, 0–1 wt. % CaO, 0–1 wt. % $K_2O$, 0–1 wt. % $Li_2O$, 0–1 wt. % $Na_2O$, 0–0.5 wt. % $ZnO.B_2O_3$ and 65–75 wt. % $SiO_2$. The amount of borosilicate glass used affects the sintering temperature. If too little borosilicate glass is used (for example, less than about 20 wt. % in this embodiment), the sintering temperature will be too high to achieve the benefits of the present invention. Maintaining the proportion of borosilicate glass within the range of about 20–50 wt. % is necessary to obtain these benefits.

A preferred high silica glass composition is sold under the tradename Corning 7913 and contains 0.5 wt. % alumina, 3 wt. %, $B_2O_3$ and 96.5 wt. % $SiO_2$.

The term "titanium silicate glass" is used herein to describe a family of glasses containing 80–99 wt. % silicon oxide ($SiO_2$) and 1–20 wt. % $TiO_2$. Titanium silicate glass has a softening point of about 1400°–1500° C. depending on its composition. Since the titanium silicate glass does not soften when fired to temperatures below about 1000° C., it can therefore be said to behave like a crystalline filler. Thus, the use of titanium silicate glass will not contribute to shape distortion or warpage during co-firing. As stated above, the shape distortion associated with high volume percent glass content can cause the via holes in the electronic package to misalign during co-firing of the metal and ceramic.

In addition to titanium silicate glass being refractory, it does not normally devitrify when used in a ceramic composition which is fired below 1000° C. In this regard, titanium silicate glass, which usually contains about 93 wt. % $SiO_2$, is different from "fused silica glass" which is virtually 100% $SiO_2$.

The cristobalite and quartz phases formed during firing remain on cooling. Cristobalite has a TCE of about $50 \times 10^{-6}$/°C. (in the 20°–300° C. range) and quartz has a TCE of about $13 \times 10^{-6}$/°C. as compared to $3.5 \times 10^{-6}$/°C. for silicon. The presence of cristobalite and/or quartz in the fired product raises the TCE and lowers the mechanical strength of the product. The loss of mechanical strength is due to the volume change associated with phase transformation which generates microcracks. Titanium silicate glass will not normally form cristobalite crystallites when it is fired to temperatures below about 1000° C.

The following examples illustrate preferred ranges of components of the glass plus ceramic compositions of the invention. In each example, the borosilicate glass is comprised of 0.98 wt. % $Al_2O_3$, 26.7 wt. % $B_2O_3$, 0.11 wt. % CaO, 0.84 wt. % $K_2O$, 0.78 wt. % $Li_2O$, 0.2 wt. % $Na_2O$ and 69.8 wt. % $SiO_2$ and the high silica glass is Corning's 7913.

EXAMPLE 1

In this example, the starting materials consisted essentially of 60 vol. % high silica glass and 40 vol. % borosilicate glass. The borosilicate glass and the high silica glass were separately ground in a 1.3 gallon ball mill for 16 hours to achieve a particle size of 2–4 microns. Since the density of the borosilicate glass and the high silica glass are approximately the same, the volume percent is roughly equivalent to the wt. %. In this example the actual wt. % of the mixture is 60.2 wt. % high silica glass and 39.8 wt. % borosilicate glass. This mixture of inorganic material was combined with 5 wt. % polyethylene glycol binder and 50 wt. % 1-propanol and mixed for 2 hours in a tubular mixer. The material was then oven dried at 80° C. for 2 hours and screened. The material was then dry pressed into 1.9 cm diameter, 0.3 cm high pellets by compressing the milled mixture in a mold at 13,000 psi (910 kg/cm²). The pellets were then fired in air. The firing was in two steps. The first step was to burn the binder out. This was accomplished by heating the pellets to 500° C. and holding for 1 hour. Next the pellets were sintered isothermally at 925° C. for various times ranging from 4 to 12 hours. Thermal expansion coefficients (TCE) were determined in the temperature range from room temperature to 200° C. using a dilatometer. The results of the thermal expansion measurements were recorded in Table 2. TCE is found to increase from 8–9 ppm/c for 4 hours to 13–14 ppm/c for 12 hours. Fired materials were analyzed using X-ray diffraction and Table 3 reports the intensity of cristobalite (100) peaks. The amount of cristobalite in the fired material is found to increase as the firing time increases. It is believed that the precipitation of cristobalite causes the increase in TCE with firing period (see FIG. 1) because the TCE of cristobalite is much larger than those of borosilicate and high silica glasses (Table 1). Dielectric constant and dielectric loss were determined by an HP 4192 AC impedance at 1 MHz. The sintered density of the sintered materials was determined by the water replacement method, according to ASTM procedure C373-72. The dielectric constant (k') dissipation factor (DF) and sintered density of the fired compacts are reported in Table 4.

TABLE 2

| Example No. | Sintering Time (Hours) | TCE (ppm/°C.) RT-200° C. |
|---|---|---|
| 1 | 4 | 8–9 |
| 1 | 8 | 12–13 |
| 1 | 12 | 13–14 |
| 2 | 4 | 3.05 |
| 2 | 8 | 3.16 |

TABLE 2-continued

| Example No. | Sintering Time (Hours) | TCE (ppm/°C) RT-200° C |
|---|---|---|
| 2 | 12 | 3.14 |

TABLE 3

| Example No. | Sintering Time (Hours) | Cristobalite (C/S) |
|---|---|---|
| 1 | 4 | 3671 |
| 1 | 8 | 5058 |
| 1 | 12 | 5454 |
| 2 | 4 | 0 |
| 2 | 12 | 0 |

C/S = count per second

TABLE 4

| Example No. | Sintering Time (Hours) | k' | D.F. (%) | % Density |
|---|---|---|---|---|
| 1 | 4 | 3.9–4.1 | 0.1–0.2 | 99.9 |
| 2 | 4 | 4.3–4.4 | 0.1–0.2 | 97.5 |

EXAMPLE 2

The procedure of Example 1 is repeated except that the inorganic composition was 50 vol. % high silica glass, 40 vol. % borosilicate glass and 10 vol % $Ga_2O_3$ (43 wt. %, 34 wt % and 23 wt. %, respectively) and the firing temperature was 925° C. The results of the thermal expansion measurements are shown in Table 2. It has been found that TCEs are very close to that of silicon and remain relatively unchanged from 4 to 12 hours (see FIG. 1). The crystallinity of the fired materials were analyzed using X-ray diffraction and Table 3 reports the observed intensity of cristobalite (100) peaks. As noted, no cristobalite is observed at 925° C. for 4–12 hours. The dielectric constant (k'), dissipation factor (D.F.) and sintered density of the fired compacts are recorded in Table 4.

The products of Examples 1-2 illustrate that the growth of cristobalite precipitate during firing can be completely prevented by the addition of a small amount of crystalline $Ga_2O_3$. This result is further demonstrated in that the TCE remains constant from 4 to 12 hours at 925° C. for the systems with crystallization inhibitor, $Ga_2O_3$, (see FIG. 1). Moreover, the TCE of the product of Example 2 is very close to that of silicon (3.4 ppm/C), which is very desirable for multilayer ceramic packaging.

The product of Example 2 contains a low glass content (25–50 vol. %) which is much less than those reported in the literature (greater than 60 vol. %). A low glass content is very desirable, because the shape distortion can be avoided during co-firing. The product of Example 2 has high sintered densities (greater than 95% of the theoretical density) obtained at temperatures of 800–950° C. in air. The sintering temperatures are compatible with those of precious metals, e.g., Au and Ag-Pd, which will enable the compositions to be utilized in a co-firable ceramic/metal electronic packaging system.

In addition, the material of Example 2 has low dielectric constants (4.32 at 1 MHz) and low dielectric losses (0.1–0.4% at 1 MHz) which are very desirable to reduce the signal propagation delay in the ceramic substrate.

The materials of Examples 1-2 can be used to form multilayer high frequency circuit packages. To form dielectric layers for multilayer high frequency circuit packages, the starting materials are ground in a ball mill until they have an average particle size of 2-4 microns. A slurry is then formed by combining the finely ground powder with a suitable solvent and other conventional additives, such as a plasticizer and a binder, in a manner known in the art. The slurry is cast into thin "green" (unfired) sheets having a thickness of about 75 to 400 microns using a conventional doctor blading process, after which the green sheets are blanked into individual 125 mm square sheets or tapes. Via holes next are formed in the green sheets by a die punching process. The holes suitably may have a diameter of about 125 microns. A conductor paste is applied in a desired pattern to the punched sheets using a screen printing process. The paste is also applied within the via holes to form connections between conductor patterns. The principal metallic constituent of the paste may be gold, silver, copper, silver/palladium alloy, gold/platinum alloy, or other suitable materials. The printed green sheets are then stacked in a desired sequence using alignment holes to insure correct positioning, and laminated together at 50–100° C. under a pressure between about 35 and 250 kg/cm². Finally, the laminated green sheets are fired at a temperature not exceeding 1000° C. to form dense, sintered ceramic multilayer circuit substrates. The firing may be done in air if the conductor metal is not susceptible to oxidation at the firing temperature. Such is the case, for example, with the metals named above, except for copper, which requires a reducing or neutral atmosphere. Sheets formed in the manner described will have a lower glass content (25-50 vol. %) and therefore a lower tendency to bow or warp.

The compositions of the present invention also can be used to form rigid, nonporous ceramic bodies by substantially conventional techniques. For example, the batch ingredients of any of the previous examples are combined with water and organic binders, and ball milled for a period of about 20 hours. The resulting slurry is spray dried to provide a powder of substantially spherical particles. This powder can be used to form bodies of various desired shapes by standard forming techniques, such as dry or isostatic pressing. The bodies are then fired at a suitable temperature not exceeding 1000° C. to provide dense, sintered ceramic objects.

Although the invention has been described in terms of a high silica glass, it is contemplated that other forms of silica may be used in practicing the present invention. However, it is not believed that quartz and/or cristobalite can be used because of their high TCE.

Although the invention has been described in terms of using a $Ga_2O_3$ as a crystal growth inhibitor, other forms of gallium containing materials having low levels of alkali ions may also be used in practicing the present invention. Although applicants do not wish to be bound by any theories, it is presently believed that the mechanism of crystallization inhibition is related to the migration of alkali ions in the borosilicate glass to the interface with the crystallization inhibitor. Photomicrographs of a microprobe have revealed that when $Ga_2O_3$ is used as a crystallization inhibitor, potassium and sodium ions in the borosilicate glass migrate toward the $Ga_2O_3$ glass interface during firing of the mixture. At the same time $Ga^{+3}$ from $Ga_2O_3$ dissolves into the glass.

It is believed that the segregation of alkali ions in the glass toward $Ga_2O_3$/glass interface suppresses the tendency of the glass to undergo phase separation at or near the firing temperature of the mixture. This phase separation is believed to be a precursor to crystallization of the glass.

It is further believed that gallium containing materials having alkali ions will reduce the migration of the alkali ions in the borosilicate glass and thus reduce the inhibition of crystal growth that would otherwise be expected. Alkali ions such as potassium are known to increase the dielectric loss of ceramic, which is very undesirable. It is believed that materials that are for all practical purposes alkali-free $Ga_2O_3$, $Ga_2SiO_5$, $Ga_2TiO_5$, GaAs, $GaP)_4$ and any gallium compounds may be used as crystal growth inhibitors in practicing the present invention.

In addition, although the invention has been described in terms of using 0.1 to 40 wt. % of a grain growth inhibitor, preferably 1 to 40 wt. % and preferred 5-20 wt. %, other amounts may also be used in practicing the present invention. The key is that enough crystalline material be used to cause the desired inhibition of crystal grain growth without introducing other undesirable properties.

It will be apparent to those skilled in the relevant art that various changes and modifications may be made in the embodiments described above to achieve the same or equivalent results without departing from the principles of the present invention as described and claimed herein. All such changes and modifications are intended to be covered by the following claims.

What is claimed is:

1. A ceramic composition for forming a ceramic dielectric body having a dielectric constant of less than about 4.5, said composition formed from a mixture comprising:
   (a) 20-50 wt. % wt. % of a low temperature glass selected from the group consisting of borosilicate glass, zinc borate glass and combinations thereof;
   40-75 wt. % of a glass selected from the group consisting of glass containing 95-98 wt. % silica, titanium silicate glass and combinations thereof; and
   (c) sufficient amounts of a gallium-containing material to inhibit the formation of crystalline forms of silica.

2. The ceramic composition of claim 1 in which said gallium-containing material comprises 1-40 wt. % of a gallium compound selected from the group consisting of $Ga_2O_3$, $Ga_2SiO_5$, $Ga_2TiO_5$, GaAs, $GaPO_4$ and combinations thereof.

3. The ceramic composition of claim 1 in which said gallium-containing material comprises 5-20 wt. % $Ga_2O_3$.

4. The ceramic composition of claim 1 in which the borosilicate glass comprises 0-3 wt. % alumina, 20-30 wt. % $B_2O_3$, 0-3 wt. % CaO, 0-3 wt. % $K_2O$, 0-3 wt. % $Li_2O$, 0-3 wt. % $Na_2O$, and 60-80 wt. % $SiO_2$.

5. The ceramic composition of claim 1 in which the high silica glass comprises 0-1 wt. % alumina, 0-5 wt. %, $B_2O_3$, 95-98 wt. % $SiO_2$, and the remainder incidental impurities.

6. The ceramic composition of claim 1 in which the titanium silicate glass comprises 1-20 wt. % titania and 80-99 wt. % silica.

7. The ceramic composition of claim 1 in which said mixture is dispersed in an organic medium, said organic medium being 31-80 wt. % of the total of said mixture and said organic medium.

8. A castable ceramic composition comprising:
   (a) 70-85 wt. % of a mixture of comprising:
     20-50 wt. % borosilicate glass;
     40-75 wt. % of a glass selected from the group consisting of glass containing 95-98 wt. % silica, titanium silicate glass and combinations thereof; and
     0.1-40 wt. % of a gallium compound; and
   (b) 15-30 wt. % of an organic medium comprised of a polymeric binder dissolved in an organic solvent.

9. The castable ceramic composition of claim 8 in which said gallium compound comprises 1-40 wt. % of a material selected from the group consisting of $Ga_2O_3$, $Ga_2SiO_5$, $Ga_2TiO_5$, GaAs, $GaPO_4$ and combinations thereof.

10. The ceramic composition of claim 8 in which said gallium compound comprises 5-20 wt. % $Ga_2O_3$.

11. A method of making a ceramic dielectric body having a dielectric constant of less than about 4.5, comprising the steps of:
    (a) providing a mixture comprising:
      20-50 wt. % borosilicate glass;
      40-75 wt. % of a glass selected from the group consisting of glass containing 95-98 wt. % silica, titanium silicate glass and combinations thereof; and
      0.1-40 wt. % of a gallium compound; and
    (b) sintering the mixture in air to a temperature not greater than about 1000° C. to form a ceramic body having less than 1 wt. % crystalline silica.

12. The castable ceramic composition of claim 11 in which said gallium compound comprises 1-40 wt. % of a material selected from the group consisting of $Ga_2O_3$, $Ga_2SiO_5$, $Ga_2TiO_5$, GaAs, $GaPO_4$ and combinations thereof.

13. The ceramic composition of claim 11 in which said gallium compound comprises 5-20 wt. % $Ga_2O_3$.

* * * * *